United States Patent
Kihara et al.

(10) Patent No.: US 6,627,671 B1
(45) Date of Patent: *Sep. 30, 2003

(54) METHODS FOR MAKING URETHANE MOLDED PRODUCTS FOR POLISHING PADS

(75) Inventors: Katushi Kihara, Touyo (JP); Yoshimi Mochizuki, Touyo (JP)

(73) Assignee: Fuji Spinning Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/384,554

(22) Filed: Aug. 27, 1999

(30) Foreign Application Priority Data

Jun. 4, 1999 (JP) ............................................. 11-157420
Jun. 4, 1999 (JP) ............................................. 11-157421

(51) Int. Cl.[7] .............................................. C08G 18/10
(52) U.S. Cl. ................. 521/159; 428/313.5; 428/317.9; 521/130; 521/137; 521/155; 521/163; 521/170
(58) Field of Search .......................... 428/313.5, 317.9; 521/130, 137, 155, 159, 163, 170

(56) References Cited

U.S. PATENT DOCUMENTS

| 3,248,454 | A | * | 4/1966 | Muller et al. |
| 3,509,079 | A | * | 4/1970 | Hyde et al. |
| 3,842,020 | A | * | 10/1974 | Garrett |
| 4,430,448 | A | * | 2/1984 | Schaefer et al. |
| 4,740,407 | A | * | 4/1988 | Schaefer et al. |
| 5,260,343 | A | * | 11/1993 | Harrison et al. |
| 5,401,824 | A | * | 3/1995 | Clatty et al. |
| 5,578,362 | A | | 11/1996 | Reinhardt et al. |
| 5,885,312 | A | * | 3/1999 | Fruitman |
| 6,062,968 | A | * | 5/2000 | Sevilla et al. |
| 6,117,000 | A | * | 9/2000 | Anjur et al. |
| 6,174,227 | B1 | * | 1/2001 | Ishikawa |
| 6,224,526 | B1 | * | 5/2001 | Stimmelmayr et al. |

FOREIGN PATENT DOCUMENTS

| EP | 29021 A | * | 5/1981 |
| JP | 57137323 A | | 8/1982 |
| JP | 6458475 A | | 3/1989 |
| JP | 8500622 A | | 1/1996 |

* cited by examiner

Primary Examiner—John M. Cooney, Jr.
(74) Attorney, Agent, or Firm—Birch, Stewart, Kolasch & Birch, LLP

(57) ABSTRACT

Urethane molded products for polishing pad comprise two types of cells having different sizes in urethane molded products formed by mixing and curing an isocyanate-terminated urethane prepolymer and an active hydrogen-containing compound. The molded products may be made by a procedure comprising mixing expanded microballoons or non-expanded, thermally expandable microspheres and water with the isocyanate-terminated urethane prepolymer and active hydrogen-containing compound and curing the mixture.

8 Claims, No Drawings

METHODS FOR MAKING URETHANE MOLDED PRODUCTS FOR POLISHING PADS

BACKGROUND OF THE INVENTION

1. Field of the Invention

This invention relates to method for making urethane molded products for polishing pad which are provided for polishing articles to be polished such as semiconductor devices, and also to urethane molded products for polishing pad.

2. Description of the Prior Art

Polishing pads used for semiconductor devices and glasses are known, including those pads of the porous non-woven fabric type obtained by applying a polyurethane solution to a non-woven fabric as set out in Japanese Laid-open Patent No. 64-58475 and of the foamed polyurethane type which is obtained by wet molding of a polyurethane solution. Both types of pads have a structure which is provided with cellular holes on the surface thereof, and thus, are a good property of holding an article to be polished at the time of polishing and are able to favorably retain a supplied grain solution (polishing slurry) therein. However, these pads are disadvantageous in that they are too soft to cause compressive deformation on use, poor in flatness of the surface of a polished article obtained by polishing, and short in life of the polishing pad.

In recent years, as semiconductor devices are highly integrated, an interconnection pattern on a substrate is more densified, under which there is a strong demand for flatness on a substrate surface as influencing the transfer of a pattern. In order to provide a more flattened wafer surface of a semiconductor substrate, there has been adopted a chemical mechanical polishing process (abbreviated as CMP process) wherein a chemical function and a mechanical function are combined. It has been demanded to develop a polishing pad which is suitably applicable to such the CMP process.

For instance, Japanese Laid-open Patent No. Hei 8-500622 discloses a polishing pad which comprises a plurality of polymeric fine elements, such as expanded microballoons, in a polyurethane matrix. The pad has a high surface hardness, so that it is more unlikely to cause compressive deformation than such a non-woven or foamed polyurethane-type polishing pad as mentioned above, thereby ensuring a high polishing rate and a good flatness. However, only one type of the expanded microballoons are mentioned as the polymeric fine elements used. When used as a polishing pad, the cells derived from the microballoons are allowed to open at the surface of the polishing pad, and abrasive grains are held at the opened cells. Nevertheless, the holding or retaining property of abrasive grains or the like with the cells alone is not satisfactory. Accordingly, there is a demand for a polishing pad which is improved in the retaining property and ensures improved polishing rate and flatness.

Further, once expanded microballoons have the drawback that they are small in specific gravity and have a great difference in specific gravity with an isocyanate-terminated urethane prepolymer, so that when mixed, they are liable to separate from each other, resulting in a poor dispersion of high viscosity, and that when such microballoons are mixed with an amine compound under agitation, air-mixing is caused. Moreover, when a microballoon-incorporated isocyanate-terminated urethane prepolymer and an amine compound are subjected to cast molding in a mold, the expanded microballoons are floated during a time before curing of the polyurethane resin, thus presenting the problem that a uniformly dispersed polishing pad cannot be obtained.

BRIEF SUMMARY OF THE INVENTION

An object of the invention is to provide the urethane molded products for use as a polishing pad, which comprises two types of cells of different sizes, created by expanded microballoons and water, in the urethane molded products, so that a polishing pad obtained by slicing the resultant urethane molded products into pieces is improved in polishing characteristics, with a reduced variation in the polishing characteristics among polishing pads.

A further object of the invention is to provide the urethane molded products for use as a polishing pad wherein two different sizes of cells are formed in the urethane molded products, including one type of cells formed by expanding non-expanded, thermally expandable microspheres and the other type of cells having a larger size than the former cells and formed with water.

According to one embodiment of the invention, there is provided a method for making urethane molded products for polishing pad which comprises mixing a mixture of expanded microballoons (A1), an isocyanate-terminated urethane prepolymer (B), and an active hydrogen-containing compound (C) with 0.005 to 0.5 wt %, based on the mixture, of water (D), and forming cells created by the action of the water (D) along with cells derived from the expanded microballoons (A1) in the resultant molded products wherein the expanded microballoons (A1) are pre-mixed with the isocyanate-terminated urethane prepolymer (B) and/or the active hydrogen-containing compound (C). It is preferred that the expanded microballoons are present in an amount of 0.1 to 10 parts by weight relative to 100 parts by weight of the total of the isocyanate-terminated urethane prepolymer (B) and the active hydrogen-containing compound (C). The urethane molded products for polishing pad obtained according to this embodiment comprises expanded microballoons (A1) and cells formed by means of water (D) therein.

According to another embodiment of the invention, there is also provided a method for making urethane molded products for polishing pad which comprises mixing a mixture of non-expanded, thermally expandable microspheres (A2), an isocyanate-terminated urethane prepolymer (B), and an active hydrogen-containing compound (C) with 0.005 to 0.5 wt %, based on the mixture, of water (D), and expanding the non-expanded, thermally expandable microspheres (A2) by application of heat of reaction and heat from outside and also forming cells created by the action of the water (D) wherein the non-expanded, thermally expandable microspheres (A2) are pre-mixed with the isocyanate-terminated urethane prepolymer (B) and/or the active hydrogen-containing compound (C). Preferably, the non-expanded, thermally expandable microspheres are present in an amount of 0.1 to 10 parts by weight relative to 100 parts by weight of the total of the isocyanate-terminated urethane prepolymer (B) and the active hydrogen-containing compound (C). The urethane molded products for polishing pad obtained according to this second embodiment of the invention comprises microballoons (A1) expanded by application of heat at the time of urethane molding and cells formed by means of water (D) therein.

In this invention, the active hydrogen-containing compound should preferably consist of a diamine compound (C1) or a mixture of the diamine compound (C1) and a low molecular weight diol (C2) having a molecular weight of 500 to 1000.

DETAILED DESCRIPTION OF THE INVENTION

As disclosed in Japanese Laid-open Patent No. Sho 57-137323 and the like, the expanded microballoons (A1) used in the present invention are obtained by thermal expansion of non-expanded, thermally expandable microspheres which individually have a low boiling hydrocarbon, such as, for example, isobutane, pentane, isopentane, petroleum ether or the like, at a center thereof and a shell encapsulating the hydrocarbon therein and made of a thermoplastic resin such as, for example, an acrylonitrile-vinylidene chloride copolymer, an acrylonitrile-methyl methacrylate copolymer, a vinyl chloride-ethylene copolymer or the like. When heated, the low boiling hydrocarbon existing at the center of each microspheres is vaporized and gasified to cause the shell portion to be softened thereby providing microballoons (A1) having a gas encapsulated therein. The expanded microballoons (A1) preferably have a size of 10 to 100 $\mu$m. If the size of the expanded microballoons (A1) is smaller than 10 $\mu$m, an appreciable polishing effect may not be expected. On the contrary, when the size is larger than 100 $\mu$m, the resultant urethane molded products for polishing pad unfavorably lowers in hardness.

The isocyanate-terminated urethane prepolymer (B) used in the invention is a reaction product obtained from a polyol or a mixture of a polyol and a low molecular weight diol and an organic diisocyanate compound under ordinarily employed reaction conditions. Examples of the organic diisocyanate compound include 2,4-tolylene diisocyanate, 2,6-tolylene diisocyanate, 4,4'-diphenylmethane diisocyanate, naphthalene-1,5-diisocyanate, tolidine diisocyanate, para-phenylene diisocyanate, xylylene diisocyanate, isophorone diisocyanate and the like. These may be used singly or in combination of two or more.

The polyol for reaction with an organic diisocyanate compound include, for example, polyether polyols such as poly(oxytetramethylene)glycol, poly(oxypropylene)glycol and the like, polycarbonate polyols, polyester polyols, and the like.

As the polyol, there may be used mixtures of low molecular weight diols such as, for example, ethylene glycol, 1,2-propylene glycol, 1,3-propylene glycol, 1,2-butanediol, 1,3-butanediol, 2-methyl-1,3-propanediol, 1,4-butanediol, neopentyl glycol, 1,5-pentanediol, 3-methyl-1,5-pentanediol, 1,6-hexanediol, diethylene glycol, dipropylene glycol and the like.

The active hydrogen-containing compound (C) used to polymerization reaction of the isocyanate-terminated urethane prepolymer (B) include, for example, diamine compound (C1) such as 3,3'-dichloro-4,4'-diaminodiphenylmethane, chloroaniline-modified dichlorodiaminodiphenylmethane, 3,5-bis(methylthio)-2,4-toluenediamine, 3,5-bis(methylthio)-2,6-toluenediamine and the like. Moreover, the active hydrogen-containing compounds (C) include, aside from the above-indicated diamine compound (C1), their mixtures with low molecular weight diol (C2) having the molecular weight in the range of 500 to 1000 such as, for example, polyether glycols such as poly(oxytetramethylene)glycol, poly(oxypropylene)glycol and the like, polycarbonate glycols, polyester glycols and the like.

In the practice of the invention, the expanded microballoons (A1) are added to and mixed with the isocyanate-terminated urethane prepolymer (B) and/or the active hydrogen-containing compound (C) and are reacted with each other. More particularly, there may be used several methods including a method wherein a dispersion, obtained by adding the expanded microballoons (A1) to the isocyanate-terminated urethane prepolymer (B), is mixed with the active hydrogen-containing compound (C) to which expanded microballoons (A1) are not added, a method wherein the isocyanate-terminated urethane prepolymer (B), to which expanded microballoons (A1) are not added, is mixed with a dispersion of the expanded microballoons (A1) in the active hydrogen-containing compound (C), and a method wherein dispersions of the expanded microballoons (A1) in the isocyanate-terminated urethane prepolymer (B) and also in the active hydrogen-containing compound (C) are mixed together.

The amount of the expanded microballoons (A1) is in the range of 0.1 to 10 parts by weight, preferably 2 to 5 parts by weight, per 100 parts by weight of the total of the isocyanate-terminated urethane polymer (B) and the active hydrogen-containing compound (C). If the amount is less than the above range, the resulting polishing pad lowers in polishing characteristics such as the polishing rate and the flatness. On the other hand, when the amount is larger, the hardness of the polishing pad unfavorably lowers.

In the practice of the invention, the dispersion of the expanded microballoons (A1) in an isocyanate-terminated urethane prepolymer (B) and the active hydrogen-containing compound (C) having not expanded microballoons (A1) therein, or isocyanate-terminated urethane prepolymer (B), to which expanded microballoons (A1) are not added, and the dispersion of the expanded microballoons (A1) in the active hydrogen-containing compound (C), or the dispersion of the expanded microballoons (A1) in the isocyanate-terminated urethane prepolymer (B) and the dispersion of the expanded microballoons (A1) in the active hydrogen-containing compound (C) may be charged into a mixer having three charge ports from the two charge ports, simultaneously with water (D) being charged from the third charge port of the mixer. Where a mixer having two charge ports is used, water may be added to the active hydrogen-containing compound (C), or to a dispersion of the expanded microballoons (A1) in the active hydrogen-containing compound (C), followed by charge into a mixer.

The thus added water (D) is mixed in the mixer and is vaporized during the course of obtaining the urethane molded products wherein the resultant cells are contained in the molded product.

The cells formed by the action of the water (D) have a size of 100 to 800 $\mu$m, which is approximately 10 times as great as the size of the expanded microballoons (A1). The number of the cells is $\frac{1}{10}$ to $\frac{1}{20}$ of that of the microballoons. When the polishing pad obtained from such the urethane molded products is used for semiconductor polishing, there are provided two types of cells having different sizes in the surface of the polishing pad, including the cells formed by rendering the expanded microballoons (A1) opened and the cells ascribed to the water (D). In addition, the urethane pad is so abraded during polishing that two types of fresh cell holes invariably develop. This leads to a large amount of abrasive grains to be held in or on the polishing pad, thereby improving polishing characteristics such as the polishing rate and the flatness. Moreover, because the surface of the polishing pad, which is brought into contact with a surface to be polished, is invariably kept clean, thereby providing an effect of preventing the surface to be polished from damaging.

The amount of the water (D) charged into the mixer is in the range of 0.005 to 0.5 wt %, preferably 0.02 to 0.05 wt %, based on the total of the expanded microballoons (A1), the isocyanate-terminated urethane prepolymer (B) and the active hydrogen-containing compound (C).

If the amount of the water (D) is less than 0.005 wt %, the cells created by the water (D) are reduced in number, so that the improvement in polishing rate and the effect of preventing a surface to be polished from damaging cannot be expected as desired. In contrast, if the amount is larger than 0.5 wt %, a ratio of cells having a size greater than that of the expanded microballoons (A1) becomes greater in the urethane molded products. Eventually, the hardness of the molded products lowers. Additionally, the resultant polishing pad is roughened on or in the surface thereof, s, that although the polishing rate is improved, the flatness unfavorably degrades.

The reaction solution or mixture from the mixer is charged into a mold preheated to 90 to 120° C. followed by clamping the mold and primary curing at 90 to 120° C. for about 30 minutes. Further, after removal from the mold, the molded product is placed in a heating oven and subjected to secondary curing at 90 to 120° C. for 5 to 20 hours.

The urethane molded products for polishing pad obtained according to the method of the invention has two types of cells having different sizes, which are, respectively, formed on the basis of the expanded microballoons (A1) and the water (D), and exhibits such properties as set out before. When the molded product is sliced into pieces, there can be obtained polishing pads having good polishing characteristics.

As mentioned above, pollshing pads can be obtained by slicing the urethane molded products into a desired thickness and cutting the resultant pieces as having a desired size. In this connection, the manner of slicing and cutting and whether or not desired grooves are formed in the surface of the polishing pad are not restricted.

In the second embodiment of the invention, non-expanded, thermally expandable microspheres (A2) are those disclosed, for example, in Japanese Laid-open Patent No. Sho 57-137323, like the expanded microballoons (A1) set out hereinbefore. When such microspheres (A2) are heated, a low boiling hydrocarbon existing at the central portion thereof is vaporized and gasified to cause a shell of the microspheres to be softened, tnereby providing expanded hollow microballoons (A) encapsulating the gas therein.

The non-expanded, thermally expandable microspheres (A2) preferably have a size of 5 to 30 μm. When expanded by application of heat, the size increases to 10 to 100 μm. If the non-expanded, thermally expandable microspheres (A2) has a size larger than 30 μm, the size after the expansion becomes too large, which is unfavorable for the urethane molded products for polishing pad. In addition, the non-expanded, thermally expandable microspheres (A2) should preferably have a specific gravity close to that of an isocyanate-terminated urethane prepolymer (B) used in order to avoid any possible trouble on use.

The non-expanded, thermally expandable microspheres (A2) is added to and mixed with the isocyanate-terminated urethane prepolymer (B) and/or the active hydrogen-containing compound (C), followed by reaction thereof. The isocyanate-terminated urethane prepolymer (B) and the active hydrogen-containing compound (C) are used as like as those set out in the first embodiment. More particularly, a dispersion of the non-expanded, thermally expandable microspheres (A2) in the isocyanate-terminated urethane prepolymer (B) and the active hydrogen-containing compound (C), to which non-expanded, thermally expandable microspheres (A2) are not added, may be mixed. Alternatively, there may be used another method wherein the isocyanate-terminated urethane prepolymer (B), to which any non-expanded, thermally expandable microspheres (A2) are not added, and a dispersion of the non-expanded, thermally expandable microspheres (A2) in the active hydrogen-containing compound (C) are mixed. Still alternatively, a further method may be used in which a dispersion of the non-expanded, thermally expandable microspheres (A2) in the isocyanate-terminated urethane prepolymer (B) and a dispersion of the non-expanded, thermally expandable microspheres (A2) in the active hydrogen-containing compound (C) are mixed.

The amount of the non-expanded, thermally expandable microspheres (A2) is in the range of 0.1 to 10 parts by weight, preferably 2 to 5 parts by weight, per 100 parts by weight of the total of the isocyanate-terminated urethane prepolymer (B) and the active hydrogen-containing compound (C). If the amount is less than the above range, the resulting polishing pad lowers polishing characteristics such as the polishing rate and the flatness. On the other hand, when the amount is larger, the hardness of the polishing pad unfavorably lowers.

In the practice of the invention, like the foregoing embodiment, the dispersion of the non-expanded, thermally expandable microspheres (A2) in an isocyanate-terminated urethane prepolymer (B) and the active hydrogen-containing compound (C), to which any non-expanded, thermally expandable microspheres (A2) are not added, or isocyanate-terminated urethane prepolymer (B), to which any non-expanded, thermally expandable microspheres (A2) are not added, and the dispersion of the non-expanded, thermally expandable microspheres (A2) in the active hydrogen-containing compound (C), or the dispersion of the non-expanded, thermally expandable microspheres (A2) in the isocyanate-terminated urethane prepolymer (B) and the dispersion of the non-expanded, thermally expandable microspheres (A2) in the active hydrogen-containing compound (C) may be charged from two charge ports of a mixer having three charge ports, simultaneously with water (D) being charged from the third charge port of the mixer. Where a mixer having two charge ports is used, water may be added to the active hydrogen-containing compound (C), or to a dispersion of the non-expanded, thermally expandable microspheres (A2) in the active hydrogen-containing compound (C), followed by charge into a mixer.

When the respective dispersions are used in the method of the invention, it is preferred to keep them at a temperature of about 100° C. or below prior to charge into a mixer and also to keep them at a temperature lower than an expanding and foaming temperature of the non-expanded, thermally expandable microspheres (A2). The non-expanded, thermally expandable microspheres (A2) start to expand by heat of reaction generated at the time when the isocyanate-terminated urethane prepolymer (B) and the active hydrogen-containing compound (C) are reacted in the mixer.

The added water (D) is mixed in the mixer and is vaporized or gasified during the course of obtaining the urethane molded products wherein the resultant cells are contained or confined in the molded products.

The cells formed by the action of the water (D) have a size of 100 to 800 μm, which is approximately 10 times as great as the size of the expanded hollow microballoons (A). The number of the cells is 1/10 to 1/20 of that of the microspheres. When the polishing pad obtained from such the urethane molded products is used for semiconductor polishing, there are provided two types of cells having different sizes in the surfaces of the polishing pad. As a consequence, the urethane pad is so abraded during polishing that two types of fresh cell holes invariably develop. This leads to a large amount of abrasive grains to be held on the polishing pad, thereby improving polishing characteristics such as the polishing rate and the flatness. Moreover, because the surface of the polishing pad, which is brought into contact with a surface to be polished, is invariably kept clean, there can be obtained an effect of preventing the surface to be polished from damaging.

The amount of the water (D) charged into the mixer is in the range of 0.005 to 0.5 wt %, preferably 0.02 to 0.05 wt %, based on the total of the non-expanded, thermally expandable microspheres (A2), the isocyanate-terminated urethane prepolymer (B) and the active hydrogen-containing compound (C).

If the amount of the water (D) is less than 0.005 wt %, the cells created by the water (D) are reduced in number, so that the improvement in polishing rate and the effect of preventing a surface to be polished from damaging due to polishing dust cannot be expected as desired. On the contrary, if the amount is larger than 0.5 wt %, a ratio of cells having a size greater than that of the expanded hollow microballoons (A) becomes greater in the urethane molded product. Eventually, the hardness of the molded product lowers. Additionally, the resultant polishing pad is roughened on or in the surfaces thereof, so that although the polishing rate is improved, flatness is unfavorably poor.

The polymer solution or mixture from the mixer is charged into a mold heated to 90 to 120° C. followed by clamping the mold and primary curing at 90 to 120° C. for about 30 minutes. Further, after removal from the mold, the molded product is placed in a heating oven and subjected to secondary curing at 90 to 120° C. for 5 to 20 hours. The heating from outside permits the non-expanded, thermally expandable microspheres (A2) to be completely expanded to provide thermally expanded hollow microballoons (A) in the urethane molded product.

The urethane molded product for polishing pad obtained in the method of the second embodiment of the invention has two types of cells having different sizes, which are, respectively, formed on the basis of the thermally expanded hollow microballoons (A) and the water (D), and exhibits such properties as set out before. When the molded product is sliced into pieces, there can be obtained polishing pads having good polishing characteristics.

The urethane molded products for polishing pad obtained by the method according to the this invention has two types of cells having different sizes dispersed therein, which are, respectively, formed on the basis of the expanded microballoons and the water or the non-expanded, thermally expandable microspheres and the water. When the urethane molded product is sliced and cut into polishing pads and they are used for semiconductor polishing, the amount of abrading grains retained in or on the polishing pad becomes large. Thus, the polishing pads exhibits excellent polishing characteristics such as a polishing rate, flatness and the like, along with the effect of remarkably improving a variation in the polishing characteristics among the polishing pads.

EXAMPLES

The invention is more particularly described by way of examples, which should not be construed as limitation thereof. In Examples, parts are by weight unless otherwise indicated.

The polishing characteristics described in Examples are evaluated according to the following procedures.

<Evaluation of Polishing Characteristics>
Polishing test conditions
  Article to be polished: $SiO_2$ film on a silicon wafer
  Loading against wafer: 5.0 psi.
  Revolutions of platen: 280 r.p.m.
  Polishing time: 60 seconds
1. Polishing rate Ten polishing pads obtained by slicing the same urethane molded product for polishing pad were provided and subjected to a polishing test under such conditions as indicated above one by one. A polished article was subjected to measurement of a thickness (Å) at 50 points of the article per unit polishing pad after and prior to the test. An average value of the differences in the thickness after and prior to the test was calculated to provide a polishing rate per unit time. The average value X and the variance value Y are expressed as X±Y, respectively, indicating the polishing rate and the variation among polishing pads.

It will be noted that a greater value of X indicates a better polishing efficiency, and a smaller value of Y indicates a smaller variation among the polishing pads.

2. Flatness

The flatness (%) of polishing pads was calculated according to the following equation using a maximum value (Max) and a minimum value (Min) of the difference in thickness of each pad after and prior to the test and an average value (Ave) of the differences in thickness based on the data of 10 pads obtained in the above test 1.

$$\text{Flatness (\%)} = \{(\text{Max}-\text{Min})/\text{Ave}\} \times 100$$

The average value M and the variance value N of the flatness of ten pads are expressed by M±N, indicating the flatness and the variation among the pads, respectively.

It will be noted that a smaller value of M indicates a better flatness, and a smaller value of N indicates a smaller variation among the polishing pads.

Example 1

40 parts of expanded microballoons (Expancel 551 DE, made by Expancel Co., Ltd.), which had a size of 30 to 50 μm and whose shell was made of an acrylonitrile-vinylidene chloride copolymer and contained an iso-butane gas therein, was added to and mixed with 1000 parts of an isocyanate-terminated urethane prepolymer, which was obtained by reaction of 770 parts of tolylene duisocyanate with a mixed glycol composed of 1000 parts of poly(oxytetramethylene) glycol and 155 parts of diethylene glycol. The resultant mixed fluid was charged into a first liquid tank and kept at 70° C. On the other hand, 238 parts of 3,3'-dichloro-4,4'-diaminodiphenylmethane used as an active hydrogen-containing compound was charged into a second liquid tank and kept at 120° C. 0.003 wt % of water based on the total of the expanded microballoons, the isocyanate-terminated urethane prepolymer and the active hydrogen-containing compound, was charged into a third liquid tank and was under control at normal temperatures. The respective fluids in the first, second and third liquid tanks were, respectively, charged into a mixer having three charge ports from the respective charge ports. While the three fluids were mixed under agitation, the resultant mixture was charged into a mold of a molding machine preheated to 110° C. clamped and subjected to primary curing at 110° C. for 30 minutes. The thus primary cured molded product was removed from the mold and subsequently subjected to secondary curing in an oven at 120° C. for 5 hours to obtain a urethane molded product. After the thus obtained urethane molded product was allowed to cool down to 25° C. it was sliced into 1.5 mm thick pieces to provide 10 polishing pads as Sample No. 2.

The above procedure was repeated except that the amount of water was changed to 0.005 wt %, 0.02 wt %, 0.03 wt %, 0.05 wt %, 0.5 wt % and 0.8 wt %, thereby obtaining Sample Nos. 3 to 8, each consisting of 10 polishing pads, respectively.

For comparison, the above procedure was repeated except that the amount of water was at 0 wt % (without addition of water), thereby obtaining 10 polishing pads as Sample No. 1.

The polishing pads of Sample Nos. 1 to 8 were each set in a polishing device and subjected to a polishing test, with the results shown in Table 1.

TABLE 1

| Sample No. | Amount of Water in Reaction Mixture (wt %) | Polishing Rate (Å/min) | Flatness (%) |
|---|---|---|---|
| 1 (Comparative Ex.) | 0 | 1830 ± 30 | 7 ± 1 |
| 2 | 0.003 | 1910 ± 20 | 6 ± 1 |
| 3 | 0.005 | 1930 ± 20 | 6 ± 1 |
| 4 | 0.02 | 1950 ± 20 | 6 ± 1 |
| 5 | 0.03 | 1950 ± 20 | 6 ± 1 |
| 6 | 0.05 | 1970 ± 20 | 6 ± 1 |
| 7 | 0.5 | 1970 ± 20 | 6 ± 1 |
| 8 | 0.8 | 1970 ± 40 | 9 ± 2 |

As will be apparent from Table 1, the pads of Sample Nos. 3 to 7 of the invention are excellent in polishing rate and flatness. In contrast, the pads of Sample No. 1 where no water was added to for comparison and the pads of sample No. 2 where the amount of water was outside the scope of the invention are excellent in flatness, but are poorer in polishing rate than those of the present invention. Moreover, the pads of Sample No. 8 where the amount of water is larger than the range defined in the invention are excellent in polishing rate, but are poorer in flatness than those pads of the invention.

Example 2

1000 parts of an isocyanate-terminated urethane prepolymer obtained in the same manner as in Example 1 was charged into a first liquid tank and kept at 80° C. A mixed fluid of 188 parts of an active hydrogen-containing compound, 3,5-bis(methylthio)-2,6-toluenediamine (Ethacure 300 of Ethyl Corporation), with 38 parts of expanded microballoons having a size of 30 to 50 μm (Expancel 551 DE) was charged into a second liquid tank and kept at 50° C. 0.02 wt % of water, based on the total of the isocyanate-terminated urethane prepolymer, active hydrogen-containing compound and expanded microballoons, was charged into a third liquid tank and was under control at normal temperatures. The fluids of the first, second and third liquid tanks were, respectively, charged from three charge ports of a mixer. While mixing the three fluids under agitation, the resultant mixture was charged into a mold of a molding machine preheated to 100° C. clamped, and subjected to primary curing by heating at 110° C. for 30 minutes. After removal of the thus primary cured molded product from the mold, it was subjected to secondary curing at 120° C. for 5 hours in an oven to obtain a urethane molded product. The thus obtained urethane molded product was allowed to cool and slice into 1.5 mm thickness to obtain 10 polishing pads as Sample No. 9.

The polishing pads of Sample No. 9 were each set in a polishing device and subjected to a polishing test, revealing that a polishing rate was at 1980±20(Å/minute) and the flatness was at 6±1 (%). Thus, the polishing pads, which were obtained by mixing the expanded microballoons with the active hydrogen-containing compound, not with the urethane prepolymer as in Example 1, and slicing the resultant urethane molded product into pieces, are also excellent in polishing characteristics.

Example 3

1000 parts of an isocyanate-terminated urethane prepolymer, which was obtained by reaction of 344 parts of tolylene diisocyanate with a mixed glycol composed of 1000 parts of poly(oxytetramethylene) glycol and 155 parts of diethylene glycol, was charged into a first liquid tank and kept at 80° C. A mixed fluid, in which 45 parts of expanded microballoons having a size of 30 to 50 μm (Expancel 551 DE) was added to and mixed with 334 parts of a 1:1 mixture of an active hydrogen-containing compound, 3,5-bis (methylthio)-2,6-toluenediamine (Ethacure 300, made by Ethyl Corporation) and poly(oxytetramethylene) glycol, was charged into a second liquid tank and kept at 50° C. 0.02 wt % of water, based on the total of the isocyanate-terminated urethane prepolymer, active hydrogen-containing compound and expanded microballoons, was charged into a third liquid tank and was under control at normal temperatures. The fluids of the first, second and third liquid tanks were, respectively, charged into a mixer having three charge ports from the respective ports. While the three fluids were mixed under agitation, the resultant mixture was charged into a mold of a molding machine preheated to 1000 C, clamped and heated at 110° C. for 30 minutes for primary curing. The thus primary cured molded product was removed from the mold, followed by secondary curing at 120° C. for 5 hours in an oven to obtain a urethane molded product. The thus obtained urethane molded product was allowed to cool down to 25° C. and sliced into 1.5 mm thickness to obtain 10 polishing pads as Sample No. 10.

The polishing pads of Sample No. 10 were each set in a polishing machine and subjected to a polishing test, with the result that the polishing rate was at 1890 +20 (Å/minute) and the flatness was 6 +1 (%). Thus it was apparent that when the low molecular weight diol was mixed and used as the active hydrogen-containing compound, the resultant pads were excellent in polishing characteristics, with a small variation among the pads.

Example 4

1000 parts of the isocyanate-terminated urethane prepolymer obtained in the same manner as in Example 3 was charged into a first liquid tank and kept at 80° C. 47 parts of expanded microballoons having a size of 30 to 50 μm (Expancel 551 DE) was added to and mixed with 432 parts of a 1:1 mixture of an active hydrogen-containing compound, chloroaniline-modified dichlorodiaminodiphenylmethane and poly(oxytetramethylene) glycol having a molecular weight of 650 was charged into a second tank and kept at 50° C. 0.02 wt % of water, based on the total of the isocyanate-terminated urethane prepolymer, active hydrogen-containing compound and expanded microballoons, was charged into a third liquid tank and was under control at normal temperatures. The fluids in the first, second and third liquid tanks were, respectively, charged into a mixer having three charge ports from the respective ports. While the three fluids were mixed under agitation, the resultant mixture was charged into a mold of a molding machine preheated to 100° C. clamped and heated at 110° C. for 30 minutes for primary curing. The thus primary cured molded product was removed from the mold, followed by secondary curing at 120° C. for 5 hours in an oven to obtain a urethane molded product. The thus obtained urethane molded product was allowed to cool down to 25° C. and sliced into 1.5 mm thickness to obtain 10 polishing pads as Sample No. 11.

The polishing pads of Sample No. 11 were each set in a polishing machine and subjected to a polishing test, with the result that the polishing rate was at 1950±20 (Å/minute) and the flatness was 6±1.5 (%). Thus it was apparent that the pads were excellent in polishing characteristics, with a small variation among the pads.

Example 5

10 polishing pads for each of Sample Nos. 12 to 17 were made in the same manner as in Example 4 except that the expanded microballoons having a size of 30 to 50 4μm (Expancel 551 DE) were added in amounts of 0.7, 2, 29, 77, 143 and 286 parts, respectively.

The polishing pads of Sample Nos. 12 to 17 were each set in a polishing device and subjected to a polishing test, with the results shown in Table 2 below.

TABLE 2

| Sample No. | Amount of expanded micro-balloons (parts by weight relative to 432 parts of active hydrogen-containing compound) | Amount (parts by weight) of expanded microballoons relative to 100 parts, in total of urethane prepolymer and active hydrogen-containing compound | Amount of water (wt %) | Polishing rate (Å/min) | Flatness (%) |
| --- | --- | --- | --- | --- | --- |
| 12 | 0.7 | 0.05 | 0.02 | 1820 ± 20 | 8 ± 1 |
| 13 | 2 | 1.14 | 0.02 | 1890 ± 20 | 6 ± 1 |
| 14 | 29 | 2.03 | 0.02 | 1930 ± 20 | 6 ± 1 |
| 15 | 77 | 5.38 | 0.02 | 1940 ± 20 | 6 ± 1 |
| 16 | 143 | 9.99 | 0.02 | 1950 ± 20 | 6 ± 1 |
| 17 | 286 | 19.97 | 0.02 | 1960 ± 30 | 9 ± 2 |

As will be apparent from Table 2, the pads of Sample Nos.13 to 16 according to the invention are excellent in polishing rate and flatness. However, with the pads of sample No. 12 wherein the amount of the expanded microballoons is less than 0.1 part by weight per 100 parts by weight of the total of the urethane prepolymer and the active hydrogen-containing compound, both polishing rate and flatness are poor, and the polishing pads of Sample No. 17 wherein the amount is larger than 10 parts by weight is poor-in flatness.

Example 6

40 parts of non-expanded, thermally expandable microspheres, whose shell was composed of an acrylonitrile-vinylidene chloride copolymer and which encapsulated isobutane gas therein and had a size of 10 to 20 μm (Matsumoto Microspheres F-30D from Matsumoto Yushi-Seiyaku Co., Ltd.), were added to and mixed with 1000 parts of an isocyanate-terminated urethane prepolymer, obtained by reaction of 770 parts of tolylene diisocyanate and a mixed glycol of 1000 parts of poly(oxytetramethylene) glycol and 155 parts of diethylene glycol to provide a mixed fluid, followed by charge into a first liquid tank and keeping at 70° C. 238 parts of an active hydrogen-containing compound, 3,3'-dichloro-4,4'-diaminodiphenylmethane, was charged into a second liquid tank, and kept at 120° C. 0.003 wt % of water, based on the total of the non-expanded, thermally expandable microspheres, isocyanate-terminated urethane prepolymer and active hydrogen-containing compound, was charged into a third liquid tank and was under control at normal temperatures. The fluids of the first, second and third liquid tanks were, respectively, charged into a mixer having three charge ports from the respective ports. While the three fluids were mixed under agitation, the resultant mixture was charged into a mold of a molding machine preheated to 100° C. clamped and heated at 110° C. for 30 minutes for primary curing. The thus primary cured molded product was removed from the mold, followed by secondary curing at 120° C. for 5 hours in an oven to obtain a urethane molded product. The thus obtained urethane molded product was allowed to cool down to 25° C. and sliced into 1.5 mm thickness to obtain 10 polishing pads as Sample No. 19.

The above procedure was repeated to obtain Sample Nos. 20 to 25, each consisting of 10 polishing pads except that the amount of water to be added was changed to 0.005 wt %, 0.02 wt %, 0.03 wt %, 0.05 wt %, 0.5 wt % and 0.8 wt %.

It will be noted that for comparison, ten polishing pads obtained in the same manner as in the above procedure using the amount of water at 0 wt % (no water being added to) and provided as Sample No. 18.

The polishing pads of Sample Nos. 18 to 25 were each set in a polishing device and subjected to a polishing test, with the results shown in Table 3.

TABLE 3

| Sample No. | Amount of Water (wt %) | Polishing Rate (Å/min) | Flatness (%) |
| --- | --- | --- | --- |
| 18(Comparative Ex.) | 0 | 1820 ± 30 | 5 ± 1 |
| 19 | 0.003 | 1900 ± 20 | 5 ± 1 |
| 20 | 0.005 | 1940 ± 20 | 5 ± 1 |
| 21 | 0.02 | 1950 ± 20 | 5 ± 1 |
| 22 | 0.03 | 1960 ± 20 | 5 ± 1 |
| 23 | 0.05 | 1960 ± 20 | 5 ± 1 |
| 24 | 0.5 | 1970 ± 20 | 5 ± 1 |
| 25 | 0.8 | 1980 ± 40 | 8 ± 2 |

According to Table 3, the polishing pads of inventive Sample Nos. 20 to 24 are all excellent in polishing rate and flatness. Although Sample No. 18 without addition of water, and Sample No. 19 where the amount of water is less are excellent in flatness, the polishing rate is inferior to those of the polishing pads of the invention. Moreover, Sample No. 25 wherein the amount of water is larger is excellent in polishing rate, but its flatness is inferior-r to those pads of the invention.

Comparative Example 23 parts of expanded microballoons whose shell was made of an acrylonitrile-vinylidene chloride copolymer and which encapsulated therein iso-butane gas and had a size of 30 to 50 μm (Expancel 551 DE, made by Expancel Co., Ltd.) was added to and mixed with 1000 parts of an isocyanate-terminated urethane prepolymer obtained by reaction of 770 parts of tolylene diisocyanate with a mixed glycol of 1000 parts of poly(oxytetramethylene) glycol and 155 parts of diethylene glycol, and the resulting mixed fluid was charged into a first liquid tank and kept at 70° C. 238 parts of 3,3'-dichloro-4,4'-diaminodiphenylmethane used as an active hydrogen-containing compound was charged into a second liquid tank and kept at 120° C. The respective fluids in the first and second liquid tank were charged into a mixer having two charge ports from the respective charge ports. While the two fluids were mixed under agitation in the mixer, the resultant mixture was charged into a mold of a molding machine preheated to 110° C. clamped and subjected to primary curing at 110° C. for 30 minutes. The thus primary cured molded product was removed from the mold and subsequently subjected to secondary curing in an oven at 120° C. for 5 hours to obtain a urethane molded product. After the thus obtained urethane molded product was allowed to cool down to 25° C. it was sliced into 1.5 mm thick pieces to provide 10 polishing pads as sample No. 26.

The polishing pads of Sample No. 26 were each set in a polishing device and subjected to a polishing test, revealing that the polishing rate was at 1810±30 (Å/minute) and the flatness was at 7±1 (%). Thus, the polishing pads of Sample No. 26 obtained according to the known procedure wherein the expanded microspheres alone were used without addition of water were inferior in polishing rate and flatness to those pads obtained form the urethane molded product of the invention.

Example 7

1000 parts of an isocyanate-terminated urethane prepolymer obtained in the same manner as in Example 6 was charged into a first liquid tank and kept at 80° C. A mixture of 188 parts of an active hydrogen-containing compound, 3,5-bis(methylthio)-2,6-toluenediamine (Ethacure 300, made by Ethyl Corporation) with 38 parts of non-expanded, thermally expandable microspheres (Matsumoto Microspheres F-30D) having a size of 10 to 20 μm, was charged into a second liquid tank and kept at 50° C. 0.02 wt % of water, based on the total of the isocyanate-terminated urethane prepolymer, active hydrogen-containing compound and non-expanded, thermally expandable microspheres, was charged into a third liquid tank and was under control at normal temperatures. The fluids in the first, second and third liquid tanks were, respectively, charged into a mixer having three charge ports from the respective ports. While the three fluids were mixed under agitation, the resultant fluid mixture was charged into a mold of a molding machine preheated to 100° C. clamped and heated at 110° C. for 30 minutes for primary curing. The thus primary cured molded product was removed from the mold, followed by secondary curing at 120° C. for 5 hours in an oven to obtain a urethane molded product. The thus obtained urethane molded product was allowed to cool down to 25° C. and sliced into 1.5 mm thickness to obtain 10 polishing pads as Sample No. 27.

The polishing pads of Sample No. 27 were each set in a polishing device and subjected to a polishing test, revealing that the polishing rate was at 1980±20 (Å/minute) and the flatness was at 4.5±1(%). Thus , the polishing pads, which were obtained by slicing the urethane molded product obtained by mixing the n on-expanded, thermally expandable microspheres, unlike Example 6, with the active hydrogen-containing compound, not with the urethane prepolymer, are apparently excellent in polishing characteristics.

Example 8

1000 parts of an isocyanate-terminated urethane prepolymer, obtained by reacting 344 parts of tolylene diisocyanate with a mixed glycol composed of 1000 parts of poly(oxytetramethylene) glycol and 155 parts of diethylene glycol, was charged into a first liquid tank and kept at 80° C. A mixed fluid consisting of 334 parts of a 1:1 mixed fluid of an active hydrogen-containing compound, 3,5-bis(methylthio)-2,6-toluenediamine (Ethacure -300, made by Ethyl Corporation) and polykoxytetramethylene) glycol having a molecular weight of 650, with 45 parts of non-expanded, thermally expandable microspheres (Matsumoto Microspheres F-30D) having a size of 10 to 20 μm, was charged into a second liquid tank and kept at 50° C. 0.02 wt % of water, based on the total of the isocyanate-terminated urethane prepolymer, active hydrogen-containing compound and non-expanded, thermally expandable microspheres, was charged into a third liquid tank and was under control at normal temperatures. The fluids of the first, second and third liquid tanks were, respectively, charged into a mixer having three charge ports from the respective ports. While the three fluids were mixed under agitation, the resultant mixture was charged into a mold of a molding machine preheated to 100° C. clamped and heated at 110° C. for 30 minutes for primary curing. The thus primary cured molded product was removed from the mold, followed by secondary curing at 120° for 5 hours in an oven to obtain a urethane molded product. The thus obtained urethane molded product was allowed to cool down to 25° C. and sliced into 1.5 mm thickness to obtain 10 polishing pads as Sample No. 28.

The polishing pads of Sample No. 28 were each set in a polishing device and subjected to a polishing test, revealing that the polishing rate was at 2000±20 (Å/minute) and the flatness was at 5±1 (%). Thus, it will be apparent that when using the low molecular weight diol as a component of the mixture for use as the active hydrogen-containing compound, the resultant polishing pads exhibit good polishing characteristics and a reduced variation among the pads.

Example 9

1000 parts of an isocyanate-terminated urethane prepolymer obtained in the same manner as in Example 8 was charged into a first liquid tank and kept at 80° C. A mixed fluid of 47 parts of non-expanded, thermally expandable microspheres having a size of 10 to 20 μm (Matsumoto Microspheres F-30D) with 432 parts of a 1:1 mixture, as an active hydrogen-containing compound, of chloroaniline-modified dichlorodiaminodiphenylmethane and a poly(oxytetramethylene) glycol having a molecular. weight of 650 was charged into a second liquid tank and kept at 50° C. 0.02 wt % of water, based on the total of the isocyanate-terminated urethane prepolymer, active hydrogen-containing compound and non-expanded, thermally expandable microspheres, was charged into a third liquid tank and was under control at normal temperatures. The fluids of the first, second and third liquid tanks were, respectively, charged into a mixer having three charge ports from the respective ports. While the three fluids were mixed under agitation, the resultant mixture was charged into a mold of a molding machine preheated to 100° C. clamped and heated at 110° C. for 30 minutes for primary curing. The thus primary cured molded product was removed from the mold, followed by secondary curing at 120° C. for 5 hours in an oven to obtain a urethane molded product. The thus obtained urethane molded product was allowed to cool down to 25° C. and sliced into 1.5 mm thickness to obtain 10 polishing pads as Sample No. 29.

The polishing pads of Sample No. 29 were each set in a polishing device and subjected to a polishing test, revealing that the polishing rate was at 1960±20 (Å/minute) and the flatness was at 5±1.5 (%). Thus, it will be apparent that the polishing pads exhibit good polishing characteristics and a reduced variation among the pads.

Example 10

The same procedure of Example 9 was repeated except that the non-expanded, thermally expandable microspheres having a size of 10 to 20 μm (Matsumoto Microspheres F-30D) were used in amounts of 1, 2, 29, 77, 143 and 286 parts, thereby obtaining Sample Nos. 30 to 35, each consisting of 10 polishing pads.

The thus obtained polishing pads of Sample Nos. 30 to 35 were each set in a polishing device and subjected to a polishing test, with the results shown in Table 4.

TABLE 4

| Sample No. | Amount of non-expanded thermally expandable microspheres (parts by weight relative to 432 parts of active hydrogen-containing compound) | Amount (parts by weight) of non-expanded microspheres relative to 100 parts, in total of urethane prepolymer and active hydrogen-containing compound | Amount of water (wt %) | Polishing rate (Å/min) | Flatness (%) |
|---|---|---|---|---|---|
| 30 | 1   | 0.06  | 0.02 | 1830 ± 20 | 6 ± 1 |
| 31 | 2   | 0.13  | 0.02 | 1900 ± 20 | 5 ± 1 |
| 32 | 29  | 2.03  | 0.02 | 1940 ± 20 | 5 ± 1 |
| 33 | 77  | 5.38  | 0.02 | 1950 ± 20 | 5 ± 1 |
| 34 | 143 | 9.99  | 0.02 | 1960 ± 20 | 5 ± 1 |
| 35 | 286 | 19.97 | 0.02 | 1960 ± 30 | 8 ± 2 |

As will be apparent from Table 4, the polishing pads of Sample Nos. 31 to 34 are excellent in both polishing rate and flatness. In contrast, the polishing pads of sample No. 30 wherein the amount of the microspheres is less than 0.1 parts by weight per 100 parts by weight, in total, of the urethane prepolymer and the active hydrogen-containing compound are inferior in polishing rate and flatness, and the polishing pads of Sample No. 35 wherein the amount is larger than 10 parts by weight is inferior in flatness.

What is claimed is:

1. A method for making urethane molded products for polishing pads, which method comprises the steps of
   providing a mixture of expanded microballoons (A1), an isocyanate-terminated urethane prepolymer (B), and an active hydrogen-containing compound (C), wherein said expanded microballoons (A1) are present in an amount of 0.1 to 10 parts per 100 parts by weight, in total, of said isocyanate-terminated urethane prepolymer (B) and said active hydrogen-containing compound (C),
   mixing water (D) in an amount of 0.02 to 0.05 wt % with said mixture, and
   forming cells derived from said water (D) in the molded products.

2. The method for making urethane molded products for polishing pads according to claim 1, wherein said active hydrogen-containing compound (C) consists of a diamine compound (C1) or a mixture of the diamine compound (C1) and a low molecular weight diol (C2) having a molecular weight of 500 to 1000.

3. The method for making urethane molded products for polishing pads according to claim 1, wherein said expanded microballoons (A1) are pre-mixed with said isocyanate-terminated urethane prepolymer (B) and/or said active hydrogen-containing compound (C).

4. A method for making urethane molded products for polishing pads, comprising the steps of:
   pre-mixing expanded microballoons (A1) with an isocyanate-terminated urethane prepolymer (B) and/or an active hydrogen-containing compound (C),
   mixing water (D) with a mixture of expanded microballoons (A1), an isocyanate-terminated urethane prepolymer (B), and an active hydrogen-containing compound (C) under agitation in an amount of 0.02 to 0.05 wt % based on the mixture,
   reacting an isocyanate-terminated urethane prepolymer (B) and an active hydrogen-containing compound (C) to produce urethane polymer and vaporizing water (D) by reaction heat,
   subjecting the reaction mixture to primary curing at a temperature in the range 90 to 120° C., and
   subjecting the reaction mixture to secondary curing at a temperature in the range 90 to 120° C., to produce urethane molded products including two types of cells having different sizes formed on the basis of the expanded microballoons (A1) and the water (D).

5. A method for making urethane molded products for polishing pads, which method comprises the steps of
   providing a mixture of non-expanded, thermally expandable microspheres (A2), an isocyanate-terminated urethane prepolymer (B), and an active hydrogen-containing compound (C), wherein said non-expanded thermally expandable microspheres (A2) are present in an amount of 0.1 to 10 parts per 100 parts by weight, in total, of said isocyanate-terminated urethane prepolymer (B) and said active hydrogen-containing compound (C),
   mixing water (D) in an amount of 0.02 to 0.05 wt % with said mixture, and
   forming cells by expanding said non-expanded, thermally expandable microspheres (A2) and cells derived from said water (D) by application of heat of reaction and also of heat from outside.

6. The method for making urethane molded products for polishing pads according to claim 5, wherein said active hydrogen-containing compound (C) consists of a diamine compound (C1) or a mixture of the diamine compound (C1) and a low molecular weight diol (C2) having a molecular weight of 500 to 1000.

7. The method for making urethane molded products for polishing pads according to claim 5, wherein said non-expanded, thermally expandable microspheres (A2) are pre-mixed with said isocyanate-terminated urethane prepolymer (B) and/or said active hydrogen-containing compound (C).

8. A method for making urethane molded products for polishing pads, comprising the steps of:
   pre-mixing non-expanded thermally expandable microspheres (A2) with an isocyanate-terminated urethane prepolymer (B) and/or an active hydrogen-containing compound (C),
   mixing water (D) with a mixture of non-expanded thermally expandable microspheres (A2), an isocyanate-terminated urethane prepolymer (B), and an active hydrogen-containing compound (C) under agitation in an amount of 0.02 to 0.05 wt % based on the mixture, reacting an isocyanate-terminated urethane prepolymer (B) and an active hydrogen-containing compound (C) to produce urethane polymer, expanding the non-expanded thermally expandable microspheres (A2) and vaporizing water (D) by reaction heat, subjecting the reaction mixture to primary curing at a temperature in the range 90 to 120° C., and subjecting the reaction mixture to secondary curing at a temperature in the range 90 to 120° C., to produce urethane molded products including two types of cells having different sizes formed on the basis of the non-expanded thermally expandable microspheres (A2) and the water (D).

* * * * *